United States Patent [19]

Nijdam

[11] Patent Number: 4,972,707
[45] Date of Patent: Nov. 27, 1990

[54] APPARATUS FOR MEASURING THE FLOW OF A FLUID

[75] Inventor: Paul J. B. Nijdam, Wageningen, Netherlands

[73] Assignee: Brooks Instrument B.V., Netherlands

[21] Appl. No.: 351,600

[22] Filed: May 15, 1989

[30] Foreign Application Priority Data

May 18, 1988 [NL] Netherlands ............... 8801277

[51] Int. Cl.$^5$ ................................. G01F 1/68
[52] U.S. Cl. ................................... 73/204.12
[58] Field of Search ........... 73/204.11, 204.12, 204.13, 73/204.27

[56] References Cited

U.S. PATENT DOCUMENTS

| | | |
|---|---|---|
| 2,594,618 | 4/1952 | Booth, Jr. .................. 73/204.12 |
| 3,650,151 | 3/1972 | Drexel . |
| 4,270,386 | 6/1981 | Hawk et al. . |
| 4,339,949 | 7/1982 | Bahner et al. .................. 73/204.11 |
| 4,355,908 | 10/1982 | Weisser et al. .............. 73/204.13 X |
| 4,415,279 | 11/1983 | Beuse et al. ................. 73/204.13 X |
| 4,440,021 | 4/1984 | Abouchar et al. ........... 73/204.27 X |
| 4,484,471 | 11/1984 | Swithenbank et al. ........... 73/204.13 |
| 4,686,856 | 8/1987 | Vavra et al. ..................... 73/204 |

FOREIGN PATENT DOCUMENTS 622482 12/1962 Belgium .

*Primary Examiner*—Herbert Goldstein
*Attorney, Agent, or Firm*—Kinney & Lange

[57] ABSTRACT

Apparatus for measuring the flow of a fluid, comprising a tube through which the fluid to be measured may flow, means for varying the temperature at a selected location of the tube and detectors for measuring the temperature in a place in the flow upstream, and in a place in the flow downstream of the selected location and means for determining the flow of the fluid from the measured temperature values, the tube being secured to, or embedded in, a layer of a material adapted to transmit heat from a section of the tube in a direction substantially normal to the tube to another section of the tube or to a heat conductor spaced apart from the tube.

9 Claims, 2 Drawing Sheets

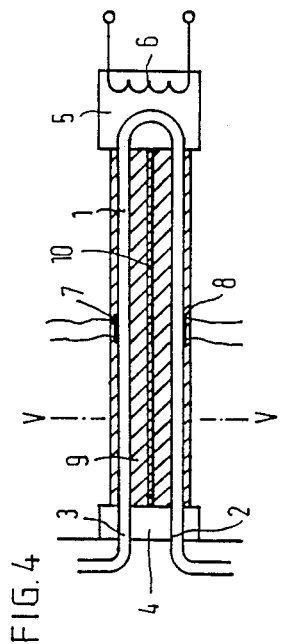
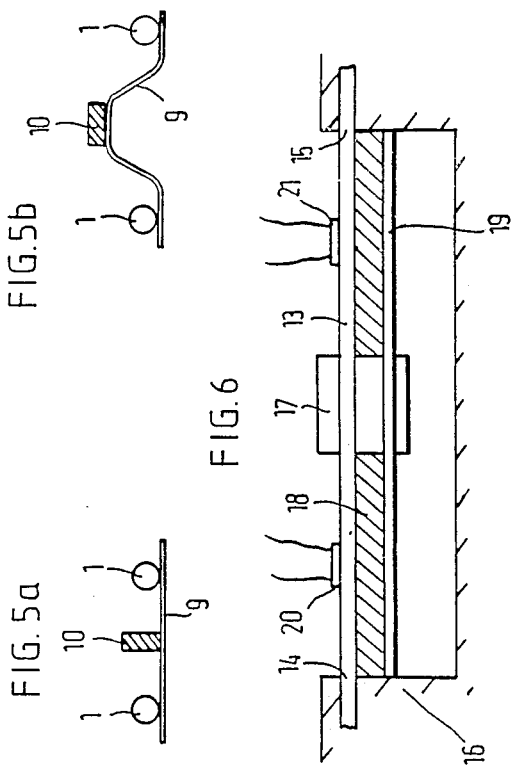
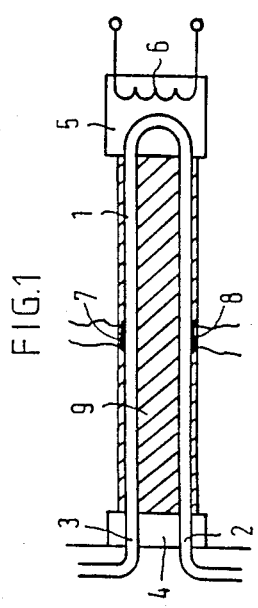
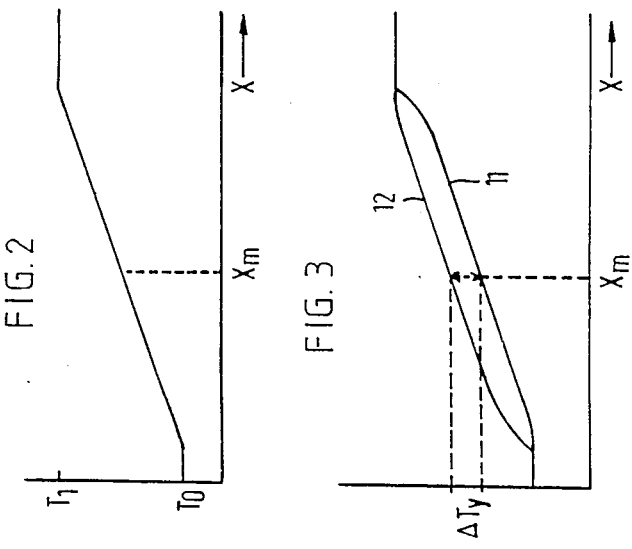

APPARATUS FOR MEASURING THE FLOW OF A FLUID

This invention relates to an apparatus for measuring the flow of a fluid, comprising a tube through which the fluid to be measured can be conducted, means for varying the temperature at a selected location of the tube and detectors for measuring the temperature in a place in the flow upstream of the selected location and a place in the flow downstream of said selected location, as well as means for determining the flow rate of the medium from the temperature values, or means for supplying the measured temperature values to separate determining means.

A flow meter of this type, designed in particular for measuring the flow rate of a gas, is disclosed in U.S. Pat. No. 3,650,151. The operation of the known flow meter is based on the fact that, in the absence of flow, a variation in the temperature at the selected location produces in principle a constant and equal, but opposite temperature gradient along the tube along two sections located symmetrically relative to said location, and on the phenomenon that this temperature profile of the tube is shifted under the influence of gas throughflow. The extent of shift is indicative of the flow rate.

The prior flow meter is not suitable for measuring the flow rate of liquids or hardly so. In view of the larger thermal capacity of liquids, as compared with that of gases or vapors, the known meter can function only, and even then inadequately in the event of not too high, flow rates. The flow rates are limited, sometimes by constructing the flow meter proper as a bypass of small cross-sectional area on the larger conduit wherein the flow rate is to be measured. In such a bypass, the rate is lower than in the main conduit to an extent which can be calculated. However, the problem is that failures often occur due to the presence of air or vapor bubbles in the liquid, differences in viscosity in bypass and main conduit and the like.

At minimal flow rates of liquid or vapor, e.g. rates in the order of some $cm^3$ per hour, the known meter cannot function properly either.

It is an object of the present invention to provide a flow meter suitable for measuring the flow rate of both liquids and gases, without the occurrence of the above drawbacks. The object comtemplated is achieved with a flow meter of the above described type, wherein the tube is secured to, or embedded in, a layer of a material adapted to transmit heat from a part of the tube in a direction substantially normal to the tube to another tube portion or to a heat conductor spaced apart from the tube.

In the following explanation of the present invention, it will be assumed for the sake of convenience, that at the selected location of the tube, the temperature is increased as a result of the tube's being heated at that location by suitable means. The teaching of the present invention, however, can also be applied to an apparatus having a tube which is cooled at the selected location. The only relevant feature is that there should be a temperature difference between the beginning and the end of the tube on the one hand and the selected location on the other.

Unlike the prior apparatus, the apparatus according to the invention is provided with means which, in the above mentioned sections located symmetrically relative to the location of temperature variation, create equal and opposite heat flows normal to the tube, and proportional to the flow rate of the medium in the tube.

In the apparatus according to the present invention, the heat-transmitting material in which or on which the tube is installed ensures that heat is transported from the part of the tube downstream of the selected location to the part of the tube upstream thereof. With a stationary fluid, a temperature profile is thus created, which in the ideal case extends along a substantially straight line from the beginning of the tube to the hottest point (the selected location) of the tube and hence decreases again along a likewise straight line to the end. When a fluid flows through the tube, the temperature profile will be slightly shifted relatively to the straight line of the ideal case, but due to the heat flows running substantially normal to the tube through the layer of heat transmitting material, it will still be substantially linear. The extent of shift is indicative of the flow rate.

In a preferred embodiment of the apparatus according to the present invention, the tube has a U-shape and the heat transmitting material is provided between the legs of the U, while the base of the U is chosen as the selected location for varying the temperature.

As there is always created a temperature difference when a fluid flows through a tube, the situation does not remain equal to the ideal case. This is first expressed at the ends of the basically linear heat profile. Owing to the flow in the tube itself the heat absorbed at these ends is no longer entirely equal to the heat given up. The linearity of the temperature profile is thus affected at the ends. This problem is avoided in a preferred embodiment of the apparatus according to the present invention, which is characterized in that a conduit of a material of high heat conductivity is arranged in spaced parallel relationship to the tube or the major part of the tube and connected to the layer of material.

The operation of such a heat-conducting conduit or guide line is easily understood. There is continuous heat flow from the location where the tube is heated to the ends through said guide line. This flow is much larger than the flow parallel thereto through the heat-transmitting layer of material and the tube itself. When the heat is absorbed is unequal to the heat given up in a length dx (x-direction parallel to the tube, y-direction normal thereto), this means that a heat transport in the x-direction is produced that is supplied substantially by the guide line. Owing to the good conduction of the guide line, the temperature profile in the center of the layer of material will be much less deformed in the case of a flowing fluid. In the y-direction, the conduction is not changed by the addition of the guide line, so that this has no influence on the temperature difference measured.

Suitably, in the apparatus according to the invention, the layer of the heat-transmitting material has the form of a metal foil.

One embodiment of the apparatus may comprise e.g. a U-shaped, bent metal tube (e.g. of stainless steel) with a metal foil (e.g. a copper foil) extending between the legs of the U and to which said legs are attached (e.g. by soldering or the like), while centrally between the legs of the U, a wire or strip of a good heat conductor (e.g. a copper wire or copper strip) is secured to the metal foil to extend parallel to said legs. Furthermore, in the embodiment with a U-shaped bent tube, the bent base of the U may suitably be secured to a block of metal (e.g. copper) in which furthermore a transistor is installed as a heating element.

Some embodiment of the present invention will now be described, by way of example, with reference to the accompanying drawings, in which:

FIG. 1 is a diagrammatic top plan view of an embodiment of the apparatus according to the present invention;

FIG. 2 shows the temperature profile in the ideal case in the absence of flow;

FIG. 3 shows the temperature profile in a substantially ideal case in the presence of flow;

FIG. 4 is a representation similar to that of FIG. 1 of another embodiment of the apparatus according to the present invention;

FIG. 5a and 5b show variants of a possible cross-sectional view taken on the line V—V of FIG. 4;

FIG. 6 diagrammatically shows still another embodiment; and

Figure 7:
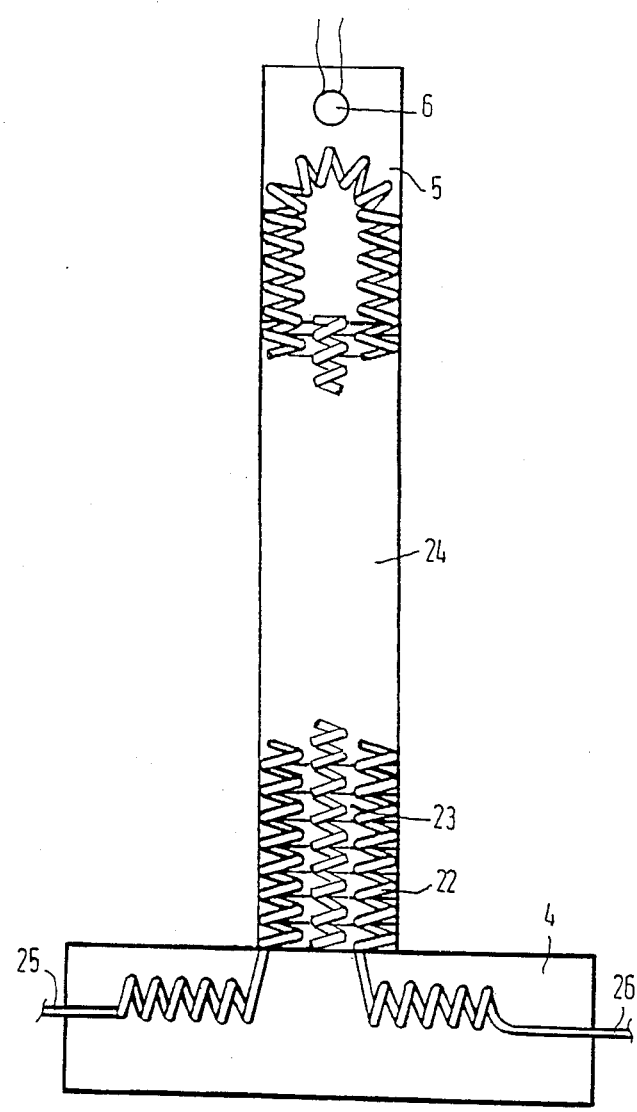
Figure 8:
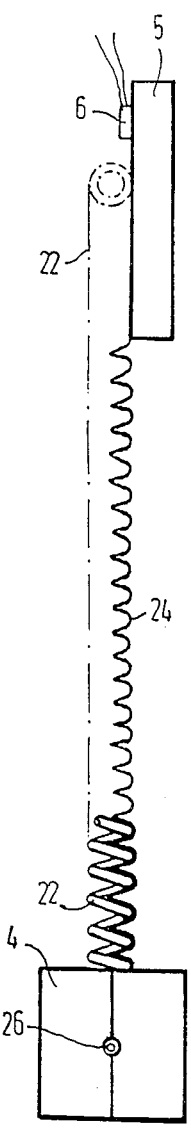

FIGS. 7 and 8 are diagrammatic illustrations in top plan view and in side-elevational view of again another embodiment.

In the figures identical or comparable parts have the same reference numerals.

The apparatus shown diagrammatically in FIG. 1 comprises a tube 1 bent into a U-shape, forming part of a transport conduit for a fluid, e.g. a liquid or a gas. The ends 2, 3 of the U-shaped tube 1 are fitted on a block 4, connected to the transport system incorporating tube 1. It may be assumed that, in operation, block 4 will have the temperature of the adjoining system, which temperature is called $T_0$.

The U-shaped bent tube 1, together with the base of the U, is installed on a block 5, which is further provided with suitable means 6 for increasing the temperature of said block 5, and hence of the base of the U-shaped tube 1, to a value $T_1$.

On either side of the base of the U, at two locations symmetrically spaced from the tube, temperature detectors 7, 8 are fitted on tube 1, by means of which the temperature of tube 1 at these locations can be measured and be transmitted to the processing means, not shown, by means of suitable lead wires.

The tube is fastened to a metal foil 9 along the entire length of the space between blocks 4, 5.

FIG. 4 shows a different embodiment of the apparatus according to the present invention, differing from that shown in FIG. 1 only in that in the center between the legs of the U of tube 1 and parallel to said legs, a metal wire or metal strip 10 is attached to the foil 9. This metal wire has the above described function of guide line.

FIGS. 5a and 5b show two possible variants of a cross-sectional view taken on the line V—V through the apparatus shown in FIG. 4. In the variant shown in FIG. 5a, tube 1 is secured to the flat foil 9 and the metal wire 10 extends centrally between the two tube sections. In the variant shown in FIG. 5b, foil 9 is arched and metal wire 10 or strip 10 is secured to the apex of the arch. The distance of the strip 10 to either of the legs of the U tube is equal, however.

A suitable embodiment as shown in FIGS. 1 or 4 comprises e.g. a tube of stainless steel having a length, from block 4 to the base of the U, of about 6 cm. The tube diameter may be about 1 mm and the wall thickness 0.1 mm. As metal foil can be employed a copper foil of e.g. 0.1 mm and when a guide line as shown in FIG. 4 is used, copper wire of about 3 mm is suitable. Block 5 may suitably be a copper block and the attachment of the tube and the guide line to the foil and of the tube to the block can be effected by soldering.

Suitable detectors (sensors) 7 and 8 are Pt elements with platinum on sapphire. A thermal column or a semiconductor device can also be used as a sensor. The temperature difference between block 4 and block 5 can be created by heating block 5 by suitable means 6, e.g. a resistor element or a power transistor. Block 5 can also be cooled e.g. with a Peltier element. On blocks 4 and 5 may be provided temperature sensors, not shown, for controlling the operation of means 6.

FIG. 2 shows the temperature profile across the apparatus shown in FIGS. 1 and 4 in the absence of flow through the tube. The profile is a straight line extending from the value $T_0$ (temperature of block 4) to the value $T_1$ (temperature of block 5). At $x_m$ are provided detectors 7, 8.

FIG. 3 shows the temperature profile in the event a medium flow through tube 1. The spaced apart lines indicate the variation along the inflow leg of the U-tube 1 (line 11) and along the outflow leg (line 12). Owing to the foil 9, lines 11, 12 are substantially linear along a major part of their length. By using the guide line 10, this linearity increases. The temperature measured by sensors 7, 8 at $x_m$ show a difference $\Delta T_y$ in the case of throughflow which is directly proportional to the flow rate.

FIG. 6 shows another embodiment of the apparatus according to the present invention, comprising a straight tube 13 incorporated in a transport system, not further shown. Tube 13 between the connections 14, 15 is clear of the system 16. At the connections 14, 15, tube 13 will have the temperature $T_0$ of the ambient system 16. Centrally between the ends 14, 15, tube 13 is attached to block 17, which is comparable to block 5 of the devices shown in FIGS. 1 and 4. Provided on block 17 are suitable heating or cooling means, not shown, to impart a temperature $T_1$ to the block and the tube.

Tube 13 is attached to the foil 18 extending on either side of block 17 as far as the ends 14, 15 of tube 13. Spaced apart from tube 13 and parallel thereto, the guide line 19 is attached to foil 18. In symmetrical places on either side of block 17, temperature sensors 20, 21 are fitted on tube 13.

In this embodiment, the temperature variation across the two portions of tube 13 upstream and downstream of block 17 is substantially linear due to the foil 18 and the guide line 19 and remains substantially linear, even upon through flow of a fluid. The temperature lines upstream and downstream of block 17, upon throughflow of a fluid, have shifted, however, relatively to each other. The extent of shift is indicative of the flow rate.

The above described embodiments of the apparatus according to the present invention are particularly suitable for use as a flow meter for liquids. When used in particular with gases, the phenomenon of thermal lag may occur. At higher rates, there is produced an apparent thermal lag, because the fluid has a finite thermal conduction. It takes time to transport heat from the center of the tube to the wall and vice versa. To solve this problem of thermal lag, the tube of the apparatus according to the invention can be spiralled. Such an embodiment is shown in FIGS. 7 and 8.

The embodiment shown comprises the coiled tube 22, again having a U-shape, the U-shaped coiled tube 22 is mounted with the base of the U on block 5 and with the legs of the U at the top on block 4. The legs of the U link up with the conduits 25 and 26 with which tube 22 is incorporated in a transport conduit system. A heating element 6, e.g. a power transistor, is mounted on block 5.

The legs of the coiled tube 22 are secured to the corrugated foil 24. Guide line 23 is fitted on foil 24 centrally between the legs and coiled in parallel relationship. The distance between tube 22 and guide line 23 is thus identical at any point.

The operation of this embodiment is identical to that of the embodiment shown in FIG. 4, as elucidated hereinbefore with reference to FIGS. 2 and 3.

I claim:

1. An apparatus for measuring the flow of a fluid, comprising a tube having a length axis through which the fluid to be measured can be conducted, means for varying the temperature at a selected location of the tube and detectors for measuring the temperature in a place in the flow upstream, and in a place in the flow downstream, of the selected location as well as means for determining the flow rate of the fluid from the measured temperature values, a layer of a material mounted in a thermal conducting relationship to at least a portion of the tube to transmit heat from a section of the tube in a direction substantially normal to the tube to another section of the tube, and a heat conductor member in heat conducting relation to the layer of a material, positioned spaced apart from the tube and extending in a direction along the length axis of the tube.

2. An apparatus as claimed in claim 1, characterized in that the tube has a U-shape and that the heat-transmitting material is provided between the legs of the U, while the base of the U is chosen as the selected location for varying the temperature.

3. An apparatus as claimed in claim 2, characterized in that the bent base of the U-shaped tube is secured to a block of metal on which there is further provided a transistor as a heating material.

4. An apparatus as claimed in claim 1, characterized in that the heat conductor member is arranged in spaced parallel relationship to at least the major part of the tube.

5. An apparatus as one of claimed in claims 1, characterized in that the layer of heat-transmitting material has the form of a metal foil.

6. The apparatus as claimed in claim 1, wherein said tube is formed into a helical spiral around its length axis.

7. The apparatus as claimed in claim 6, wherein said layer of material is corrugated to fit partially around the tube in the coiled form and extending along the length of the tube.

8. The apparatus of claim 1, wherein said tube is coiled around its length axis, and the length axis forms generally a U-shape with a pair of spaced apart and generally co-extensive legs being formed of the coils of the tube, said layer of material comprising a layer that is corrugated to conform at least partially to the coils of both legs of the tube, and said heat conductor member comprising a coiled heat conductor positioned between the legs of the coiled tube and engaging the corrugations of said layer of material in heat conducting relationship.

9. An apparatus for measuring the flow of a fluid, comprising a tube through which the fluid to be measured can be conducted, means for varying the temperature at a selected location of the tube and detectors for measuring the temperature in a place in the flow upstream, and in a place in the flow downstream, of the selected location as well as means for determining the flow rate of the fluid from the measured temperature values, said tube being a metal tube bent into a U-shape forming spaced legs, a thin metal layer extending between the legs of the U and to which layer said legs are thermally secured to transmit heat from at least one section of a leg of the tube to the other leg; and a metal conduit, which is a good heat conductor, secured to the metal layer between and substantially parallel to said legs.

* * * * *

UNITED STATES PATENT AND TRADEMARK OFFICE
CERTIFICATE OF CORRECTION

PATENT NO. : 4,972,707

DATED : November 27, 1990

INVENTOR(S) : Paul J. B. Nijdam

It is certified that error appears in the above-identified patent and that said Letters Patent is hereby corrected as shown below:

Col. 3, line 42, delete "The tube", insert --The tube 1--.

Col. 3, line 57, delete "FIG. 5b", insert --FIG. 5a--.

Col. 4, line 49, delete "through flow", insert --throughflow--.

Col. 6, line 3, delete "one of" and "claims" should read --claim--.

Signed and Sealed this

Twenty-eighth Day of July, 1992

*Attest:*

DOUGLAS B. COMER

*Attesting Officer*      *Acting Commissioner of Patents and Trademarks*